United States Patent [19]
Wallström

[11] Patent Number: 5,466,097
[45] Date of Patent: Nov. 14, 1995

[54] CUTTING INSERT WITH TWISTED CHIP SURFACE

[75] Inventor: Lars-Gunnar Wallström, Sandviken, Sweden

[73] Assignee: Sandvik AB, Sandviken, Sweden

[21] Appl. No.: 185,214

[22] Filed: Jan. 24, 1994

[30] Foreign Application Priority Data

Jan. 27, 1993 [SE] Sweden .................... 9300238

[51] Int. Cl.$^6$ ..................................... B23C 5/02
[52] U.S. Cl. .......................... 407/113; 407/114
[58] Field of Search ..................... 407/113, 114

[56] References Cited

U.S. PATENT DOCUMENTS

| | | | |
|---|---|---|---|
| 1,414,520 | 5/1922 | Martin | 407/120 |
| 3,781,956 | 1/1974 | Jones et al. | 407/113 |
| 4,059,363 | 11/1977 | Romagnolo | 407/114 |
| 4,632,607 | 12/1986 | Pantzar . | |
| 4,699,549 | 10/1987 | Shimomura et al. | 407/113 |
| 4,940,369 | 7/1990 | Aebi et al. | 407/113 |
| 4,946,318 | 8/1990 | David et al. | 407/42 |
| 5,052,863 | 10/1991 | Satran . | |
| 5,071,292 | 12/1991 | Satran | 407/113 |
| 5,145,295 | 9/1992 | Satran | 407/113 |
| 5,199,827 | 4/1993 | Pantzar . | |

FOREIGN PATENT DOCUMENTS

| | | | |
|---|---|---|---|
| 0555192 | 8/1993 | European Pat. Off. . | |
| 46-20788 | 6/1971 | Japan | 407/114 |
| 456564 | 10/1988 | Sweden . | |
| 646691 | 5/1991 | U.S.S.R. . | |

Primary Examiner—Maurina T. Rachuba
Attorney, Agent, or Firm—Burns, Doane, Swecker & Mathis

[57] ABSTRACT

A cutting insert for chip forming machining tools is formed with a chip surface whose chip or rake angle increases with increasing cutting depth. In this manner the cutting edge becomes stronger closer to the operative cutting insert corner, where the work load is the largest. Simultaneously, the rake angle increases and the cutting forces diminish towards increasing cutting depth, where the specific work load is smaller.

6 Claims, 1 Drawing Sheet

Fig. 1
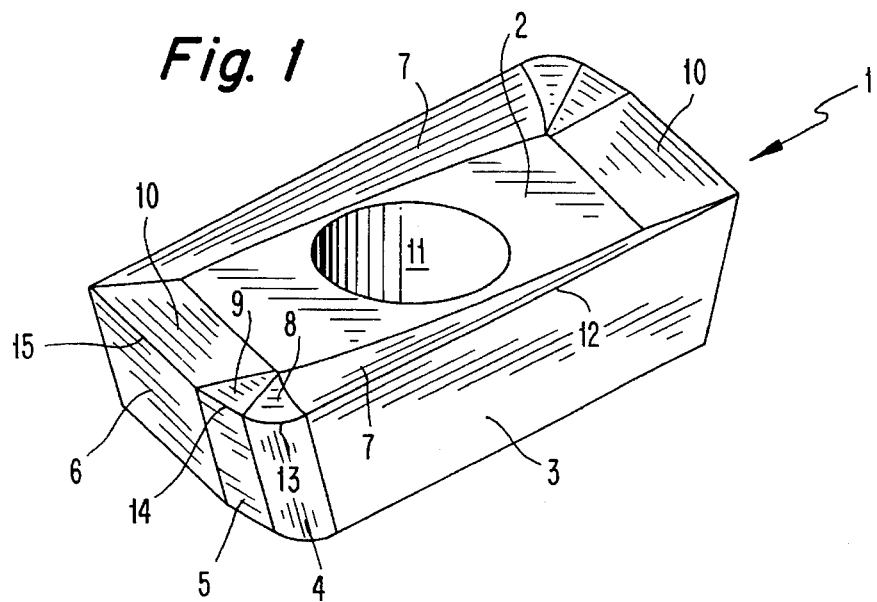
Fig. 2
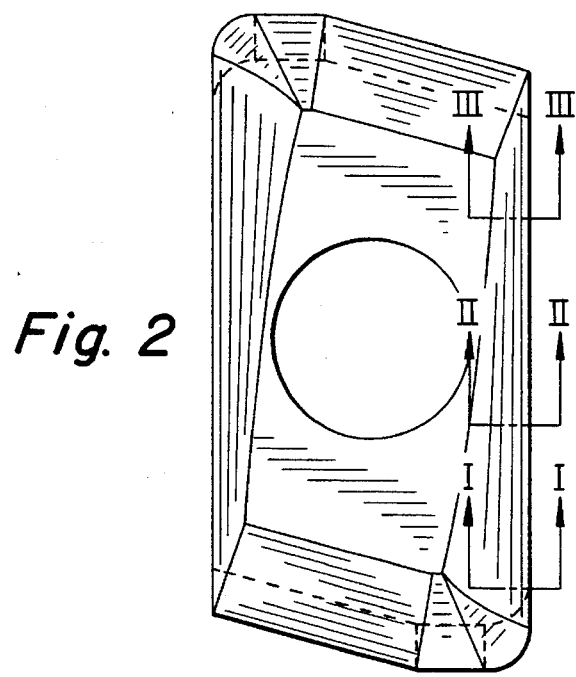
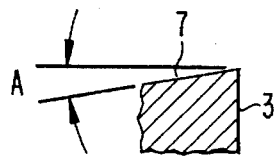
Fig. 3a
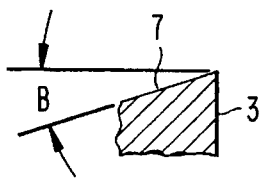
Fig. 3b
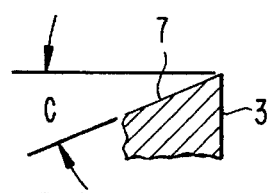
Fig. 3c 5,466,097

CUTTING INSERT WITH TWISTED CHIP SURFACE

BACKGROUND AND SUMMARY OF THE PRESENT INVENTION

The present invention relates to a cutting insert for chip forming machining tools, in particular milling cutters, such as face millers. The cutting inserts are preferably produced by form pressing and sintering of an insert forming powder. The cutting insert comprises an upper chip surface, a lower, planar bottom surface which is adapted to be located in abutment with a cooperating bottom support surface of the machining tool, and at least three side surfaces extending between the upper and bottom surfaces. At least one of the side surfaces adjoins the upper chip surface along an edge which constitutes a cutting edge.

Such inserts are more and more produced by a direct pressing method during which a cemented carbide powder is first shaped into a desired form by a pressing tool adapted for the purpose and subsequently is given final strength by sintering in an oven at temperatures above 1000° C. The pressing operation has been sophisticated over the years and is today so well defined that the process provides good possibilities of shaping the cutting edge, adjacent chip forming surfaces, possible reinforcing chamfers and clearance surfaces with great exactitude. Moreover, even the subsequent shrinkage that occurs during sintering can be included into the computation for the pressing tool dimensioning.

Today's cutting geometries tend towards sharper and sharper rake angles, i.e., more and more positive rake angles. As is well known, this brings about several advantages, such as a small cutting force and thereby a low energy consumption, a well-defined cutting edge for high dimension precision, as well as greater liberty when selecting the clearance angle, with maintained positive cutting geometry. The drawback is naturally that the cutting edge angle becomes sharper and thereby weaker, which can cause chipping in the cutting edge, particularly at higher work loads such as at higher feeds and/or higher cutting depths. The most exposed part of a usual indexable insert is the cutting edge end, i.e., the corner of the insert that is in engagement with the work piece. Therefore, the end or the immediate proximity thereof is most susceptible to wearings such as chipping and breakage. Consequently, it would be desirable to reinforce the cutting edge corner so that it can withstand high work loads, while simultaneously retaining a cutting geometry as positive as possible, the latter for the purpose of attaining a cutting force as small as possible. Particularly at larger cutting depths, where a larger part of the cutting edge is in engagement with the work piece, a chip angle as positive as possible is desirable, since the cutting force increases with increased cutting depth. At small cutting depths, the effect of the ordinary milling machines is normally sufficient.

The present invention has in a surprising and unexpected manner succeeded in satisfying both of the above indicated criteria although, seemingly incompatible, of a strong cutting corner portion and a most positive as possible chip angle. This result has been achieved by designing the chip surface with a helically twisted form in such a manner that the rake angle increases with increasing cutting depth.

A cutting insert for chip forming machining tools according to the present invention is formed with a chip surface whose chip or rake angle increases with increasing cutting depth. In this manner the cutting edge becomes stronger closer to the operative cutting insert corner, where the work load is the largest. Simultaneously, the rake angle increases and the cutting forces diminish towards increasing cutting depth, where the specific work load is smaller.

Indexable cutting inserts with twisted chip surfaces along the cutting edges are already known per se, see for example EP-A-239 045 and EP-A-392 730. However, both of these publications disclose inserts whose chip surfaces are twisted in a directly contrary manner relative to the present invention, i.e., the rake angles nearest the cutting insert corner in these publications, have a maximally positive chip angle, while at the "cutting depth maximum," these publications disclose the least positive rake angle.

Consequently, these known inserts are impaired by two drawbacks which the present invention has managed to eliminate. On the one hand, the known inserts suffer a weakened cutting corner portion and on the other hand the specific cutting force increases with increasing cutting depth. Further, the two EP publications both disclose the feature that the clearance surface shall be helically formed, for the purpose of holding the cutting edge angle constant. Even if this constant angle in itself entails the advantage that the clearance angle can be kept substantially constant in relation to the work piece at positive axial inclinations of the insert, this prior art design nevertheless also results in the disadvantage of a further weakening of the cutting edge in comparison with an indexable insert whose side faces are perpendicular or slightly inclined with a constant obtuse angle in relation to the planar bottom surface.

The inserts according to the present invention have turned out to be surprisingly capable when machining hard materials, as well as workpieces with many cavities, for example, aluminum-based profiles in the aeronautic industry. The inserts have even advantageously been used on a steel with a low carbon content without any tendency of burring. Thanks to the advantageous positive cutting geometry, the inserts according to the present invention have also been successfully used in connection with weaker milling machines.

BRIEF DESCRIPTION OF THE DRAWING FIGURES

For illustrating but non-limiting purposes, the invention will now be more closely described in connection with a preferred embodiment as illustrated in the appended drawings, wherein like members bear like reference numerals, and wherein:

FIG. 1 is a perspective view of the cutting insert according to the present invention;

FIG. 2 is a top view of the insert according to the present invention; and

FIGS. 3a, 3b and 3c are cross-sectional views along lines I—I, II—II and III—III in FIG. 2, respectively.

DETAILED DESCRIPTION OF THE PREFERRED EMBODIMENT

With reference to FIGS. 1 and 2, an indexable cutting insert 1 has either a rectangular (FIG. 1) or a rhombic basic form (FIG. 2). The insert includes a substantially planar upper surface 2 and planar bottom surface, which is suitably plane-parallel with the upper surface 2. Between the upper surface and the bottom surface, side surfaces 3 extend along the longer sides of the cutting insert and side surfaces 6, 6' extend along the shorter sides of the cutting insert. At the cutting insert corners smoothly rounded side portions 4 are provided. Between the side faces are surfaces 6, 6' and the rounded side portions 4 extend the planar faces 5.

The side faces 3, 5 and 6 are substantially planar. The inclination of the side faces in relation to the upper surface 2 and the bottom surface does not constitute an essential feature of the present invention. However, in accordance with known technology, the side faces form a perpendicular or an acute angle with the upper surface 2, with the aim of providing suitable clearance. Consequently, the angle between the side faces and the upper surface 2 can vary between 65° and 90°, preferably between 75° and 85°.

Between the upper edges of the side faces 3, 4, 5 and 6 and the planar upper surface 2, extend the chip surfaces 7, 8, 9 and 10, respectively (7', 8', 9' and 10' in FIG. 2). In accordance with FIGS. 1 and 2, the chip surfaces rise above the plane of the upper surface 2, from the delimiting lines of the upper surface 2 up to the cutting edges 12, 13 and 14, as well as an edge 15. The cutting edge 12 constitutes the main cutting edge, the cutting edge 13 the corner cutting edge and the cutting edge 14 the secondary cutting edge or planing cutting edge. The cutting edge 14 has the task of generating the workpiece surface, while the task of the main cutting edge is to cut chips from the work piece. The angle between the secondary cutting edge 14 and the extension of the edge 15 is not an essential feature of the present invention, but is suitably between 0.5° and 20°, preferably between 1° and 10°.

In accordance with the present invention, the chip surfaces 7, 7' are helically twisted in a counter-clockwise direction, starting off from an operative cutting insert corner. With reference to FIGS. 3a, 3b and 3c, the rake angle of the chip surface 7,7' increases with increasing distance from the cutting insert corner. The rake angle A near the insert corner is suitably between 5° and 35°; the angle B being generally midway between the corners is preferably between 10° and 40°; and the angle C; furthest from the insert corner, being between 15° and 45°. All of these angles are subject to the condition that angle A<angle B<angle C. Preferably, A is between 5° and 15°, B is between 10° and 20° and C is between 15° and 25°, again provided that A<B<C.

The inclination of the chip surface 10 is not critical for the present invention since it is not used primarily as a chip surface. However, the insert can also be allotted a square basic form, whereby edge 15 is also used as a main cutting edge, similar to the cutting edge 12, the two mentioned edges being of equal length in the square configuration. According to the square insert embodiment, the chip surfaces which then replace the surfaces 10 are also preferably provided with a helically twisted structure, similar to the chip surfaces 7, 7'.

The inclination of the surfaces 8 and 9 towards the horizontal plane is not an essential feature of the present invention. However, it should not exceed the inclination of the adjacent part of the chip surface 7, 7'.

The insert according to the invention is suitably provided with a centrally situated through-hole 11, for the insertion of an appropriate clamping means, such as a screw, a locking pin, etc.

According to the illustrated embodiment, the main cutting edge is completely straight. However, it can also be slightly curved outwards, in order to compensate for a positive axial inclination of the insert and thus better guarantee complete planarity of the milled surface.

The principles, preferred embodiment and mode of operation have been described in the foregoing specification. However, variations and changes may be made that fall within the spirit and scope of the present invention. Therefore, the invention which is intended to be protected is defined in the attached claims.

What is claimed is:

1. A milling cutting insert for chip forming machining tools, comprising an upper surface, a lower planar bottom surface which is adapted to be located in abutment with a cooperating support surface of the machining tool, at least three side surfaces extending between the upper and bottom surfaces, the side surfaces forming an acute angle relative to the upper surface, at least one of the side surfaces adjoining a helically twisted chip surface along an edge which forms a main cutting edge, at least another of the side surfaces adjoining the upper surface along an edge which forms a secondary cutting edge and a third edge wherein the secondary cutting edge and the third edge are non-collinear, and cutting corners, the helically twisted chip surface having a rake angle increasing with increasing cutting depth.

2. The insert according to claim 1, wherein the rake angle is at least 5° nearest a cutting insert corner and maximally 45° furthest away from the cutting insert corner.

3. The insert according to claim 1, wherein the side surfaces are substantially planar.

4. The insert according to claim 2, wherein the side surfaces are substantially planar.

5. The insert according to claim 1, wherein the insert is produced by form-pressing and sintering of a powder of an insert-forming material.

6. A cutting insert for a chip forming milling cutter, comprising an upper surface, a lower planar bottom surface which is adapted to be located in abutment with a cooperating surface of the milling cutter, side surfaces extending between the upper and bottom surfaces and forming acute angles with the upper surface, a chip surface extending from the upper surface of the insert and adjoining a first side surface at a main cutting edge, a second side surface adjoining the upper surface along a secondary cutting edge and a third edge, wherein the secondary cutting edge and the third edge are non-collinear, an operative cutting insert corner connecting said main cutting edge and said secondary cutting insert edge, said main cutting edge having a chip angle between the chip surface and the first side surface increases toward the operative cutting corner, such that the cutting edge is stronger closer to the operative cutting insert corner, where the work load is the largest, and the decreased chip angle is present where the work load is smaller.

* * * * *